Feb. 10, 1931.  B. M. SHIPLEY  1,791,875
CASH REGISTER
Filed June 30, 1926  6 Sheets-Sheet 1

Inventor
Bernis M. Shipley
By
Earl Beust
Henry E. Stauffer
His Attorneys

Feb. 10, 1931. B. M. SHIPLEY 1,791,875
CASH REGISTER
Filed June 30, 1926 6 Sheets-Sheet 2
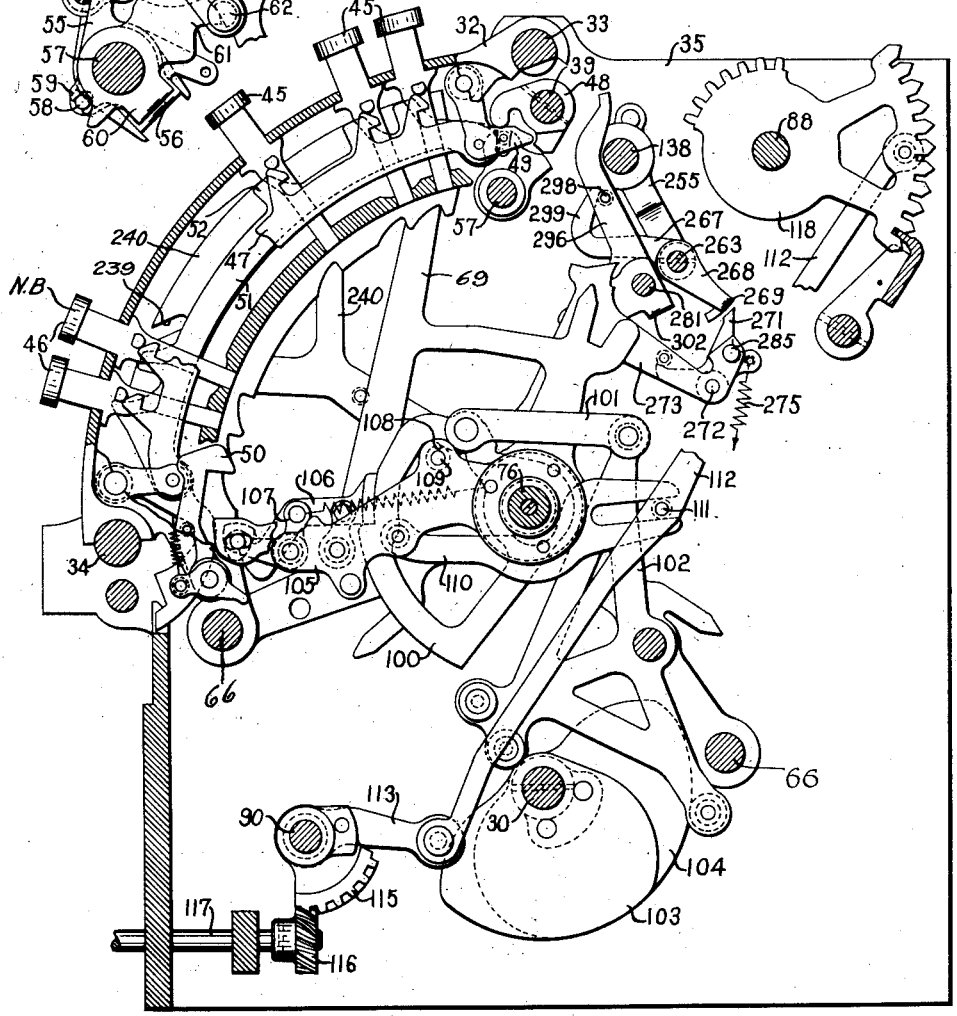
Inventor
Bernis M. Shipley
By
His Attorneys Feb. 10, 1931.  B. M. SHIPLEY  1,791,875
CASH REGISTER
Filed June 30, 1926  6 Sheets-Sheet 3
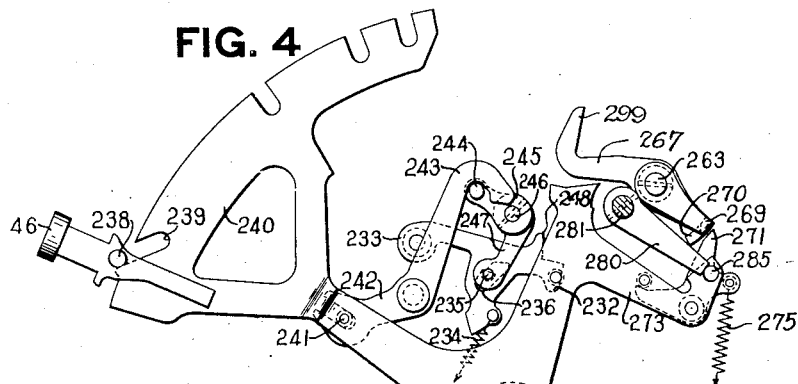
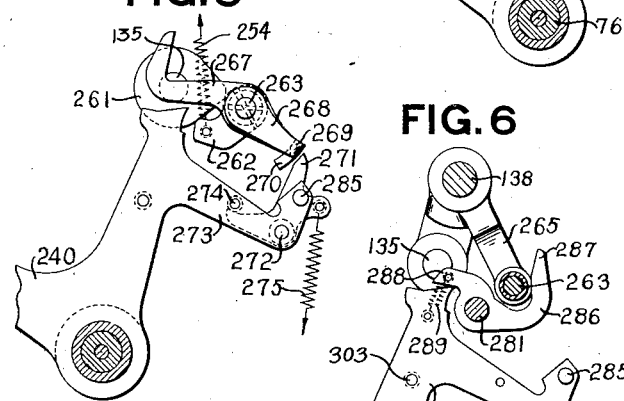
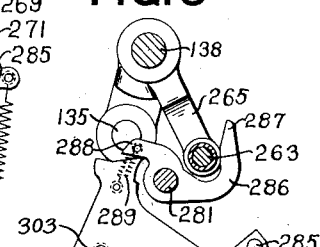
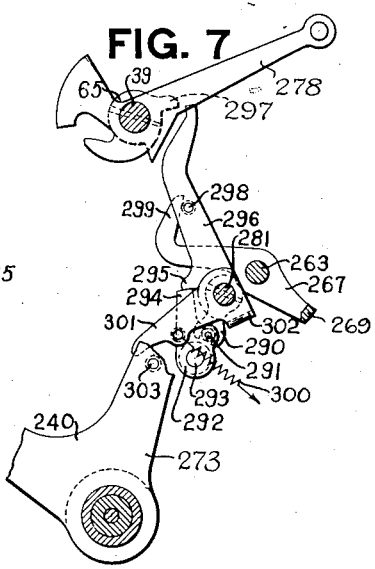
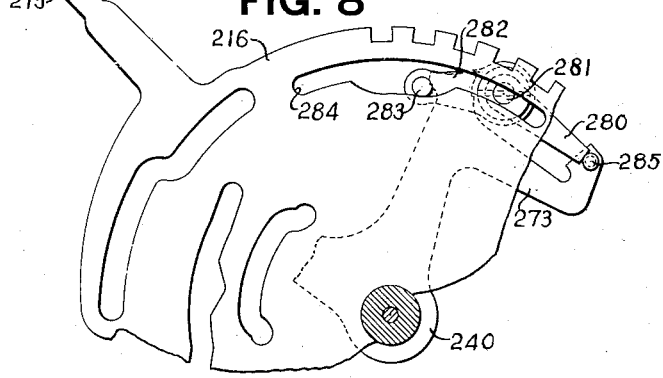
Inventor
Bernis M. Shipley
By
His Attorneys Feb. 10, 1931. B. M. SHIPLEY 1,791,875
CASH REGISTER
Filed June 30, 1926 6 Sheets-Sheet 4
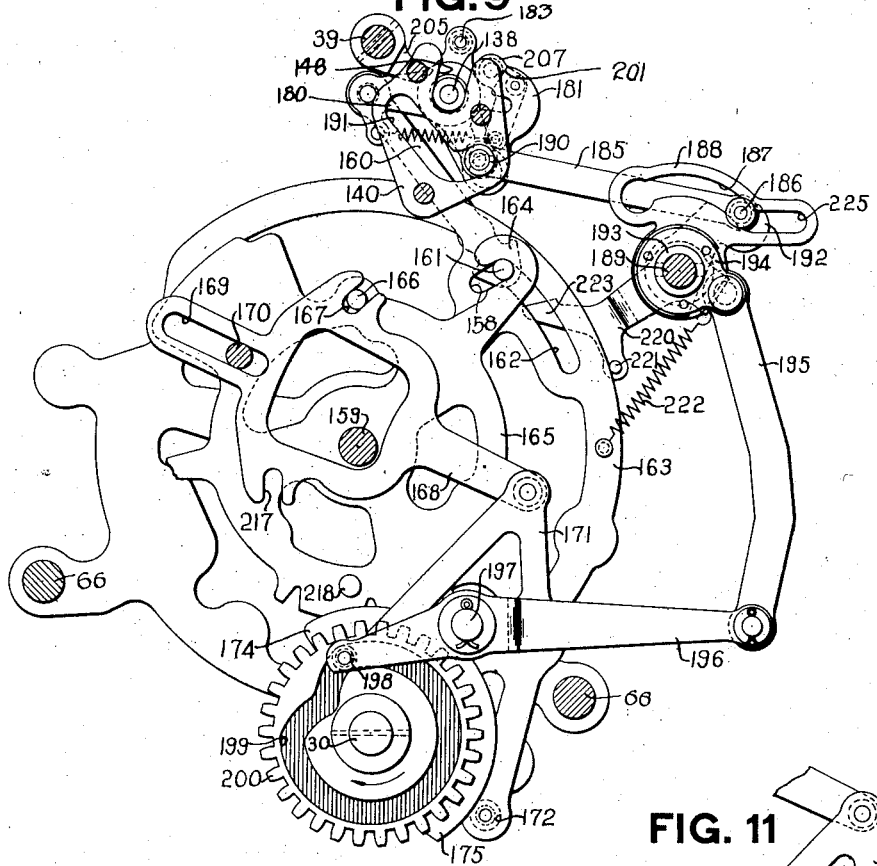
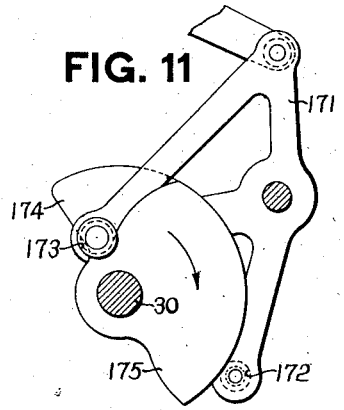
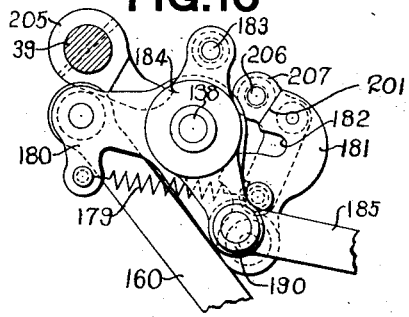
Inventor
Bernis M. Shipley
By
His Attorneys Feb. 10, 1931. B. M. SHIPLEY 1,791,875
CASH REGISTER
Filed June 30, 1926 6 Sheets-Sheet 5
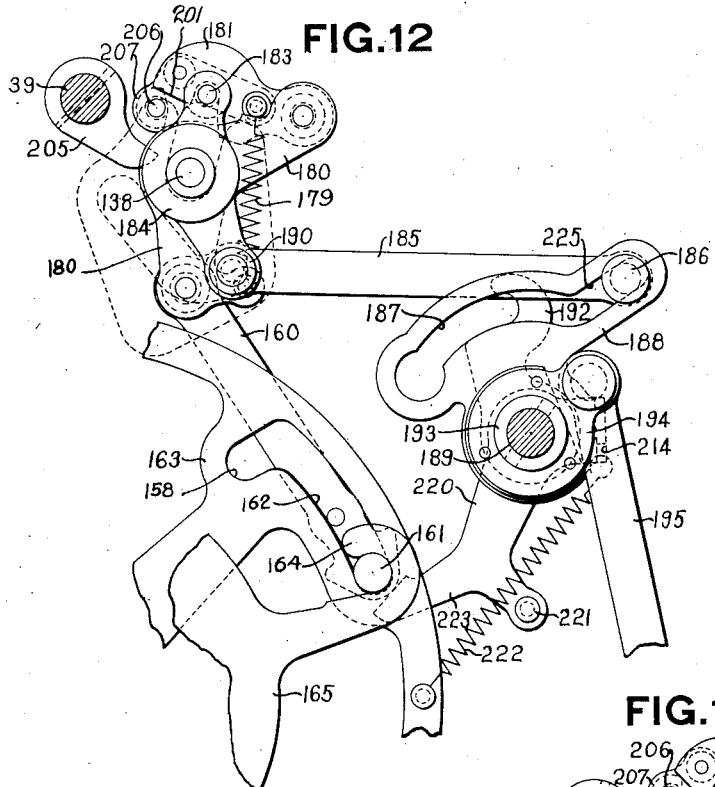
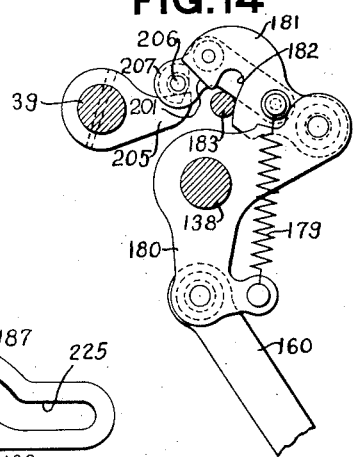
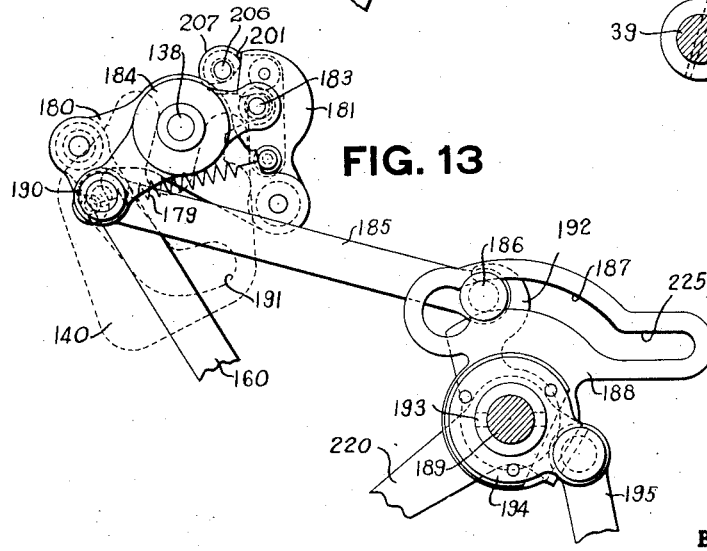
Inventor
Bernis M. Shipley
By
His Attorneys Feb. 10, 1931.  B. M. SHIPLEY  1,791,875
CASH REGISTER
Filed June 30, 1926  6 Sheets-Sheet 6
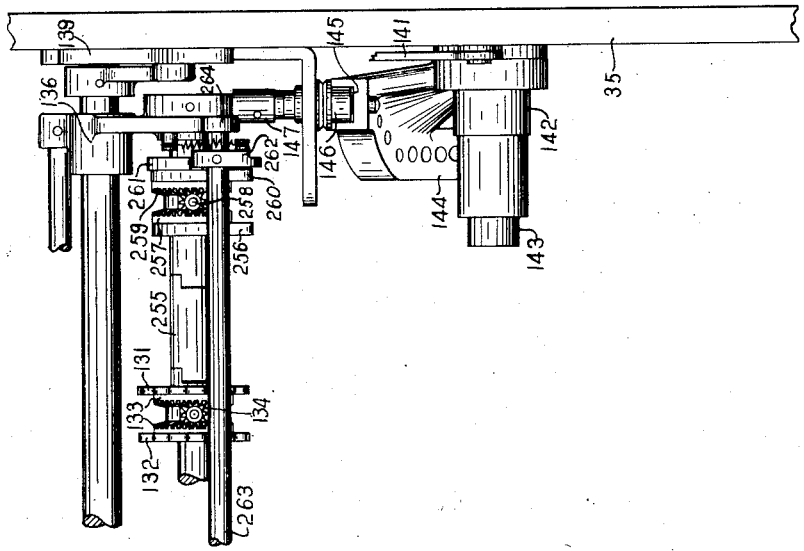
FIG. 15
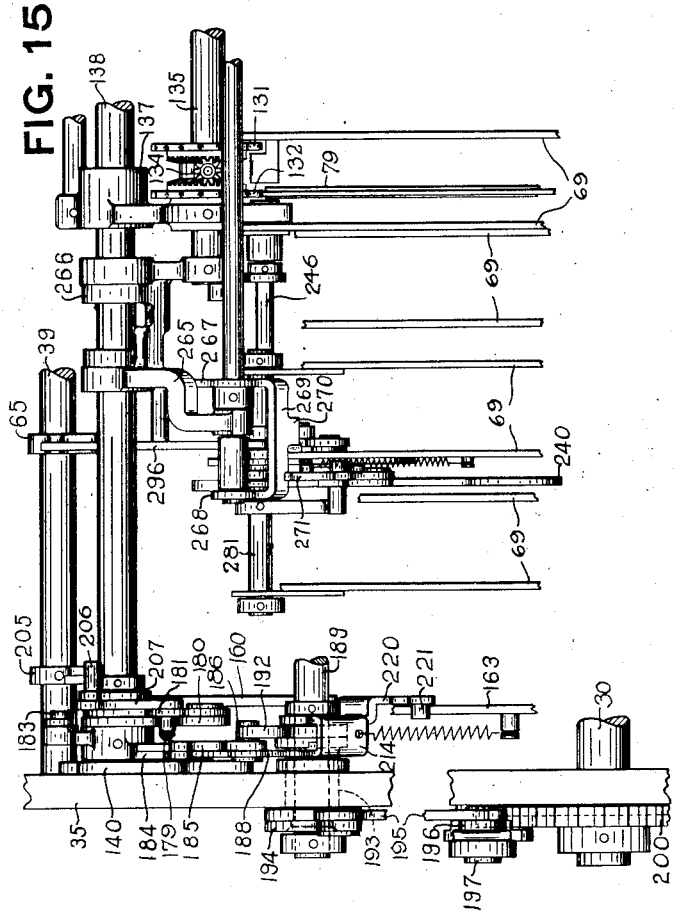
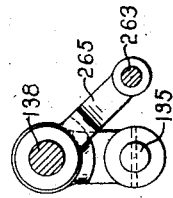
FIG. 16
Inventor
Bernis M. Shipley
By Earl Beust
Henry E. Stauffer
His Attorneys Patented Feb. 10, 1931

1,791,875

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed June 30, 1926. Serial No. 119,650.

This invention relates to cash registers and more particularly to mechanism for correcting the negative balance standing on the totalizer when a greater amount has been subtracted from a smaller amount.

One object of this invention is to enforce the addition of one unit to the minus side of an adding and subtracting totalizer when a negative total is to be printed therefrom.

Another object is to prevent the addition of one unit to the negative units wheel until a negative balance has been placed thereon.

Still another object is to prevent the said addition of one unit to the minus side of the totalizer, unless the total lever of the machine has been placed in the proper resetting position.

Another object is to prevent the releasing of the correction key by the manual key release.

Still another object is to prevent the release of the machine by any key except the correction key, when the total lever has been moved to the first position below its adding position, which position corresponds to the adding and subtracting totalizer.

With these and incidental objects in view, the invention includes certain novel features of construction and combinations of parts, the essential elements of which are set forth in the appended claims and the preferred form of embodiment of which is hereinafter described with reference to the drawings which accompany and form part of this specification.

Of said drawings:

Fig. 2 is a detail side view of a portion of the release mechanism.

Fig. 3 is a section through the machine taken just to the right of the balance bank of control keys.

Fig. 4 is a detail side view of the negative balance correction key and the mechanism which co-operates therewith.

Fig. 5 is a detail side view of the mechanism which is operated by the adding and subtracting totalizer to unlock the negative balance correction key for operation.

Fig. 6 is a detail side elevation of the means for preventing the release of the negative balance correction key by the manual key release.

Fig. 7 is a detail view of the means for preventing the releasing of the machine until the correction key is depressed, after the total lever has been moved to the reset position for the adding and subtracting totalizer.

Fig. 8 shows the mechanism operated by the total lever in shifting to its reset position.

Fig. 9 is a sectional view of the totalizer engaging mechanism and the means for disconnecting said engaging mechanism from the adding and subtracting totalizer line on certain operations.

Fig. 10 shows the mechanism for connecting the adding and subtracting totalizer to the engaging mechanism in its disconnected position.

Fig. 11 is a detail side view of the pair of cams and the members which co-operate therewith to drive the totalizer engaging mechanism.

Fig. 12 shows the connecting mechanism in effective position, and the totalizer frame in the position it assumes when the totalizer is in engagement with the actuators.

Fig. 13 shows the connecting mechanism in effective position and the totalizer frame in the position it assumes when the totalizer is out of engagement with the actuators.

Fig. 14 shows the connecting mechanism just at the time when it has been disconnected by the release shaft.

Fig. 15 is a rear view of the adding and subtracting totalizer line, together with some of the mechanism which co-operates therewith.

Fig. 16 is a detail end view of the frame for supporting the adding and subtracting totalizer.

General description

Figure 1:
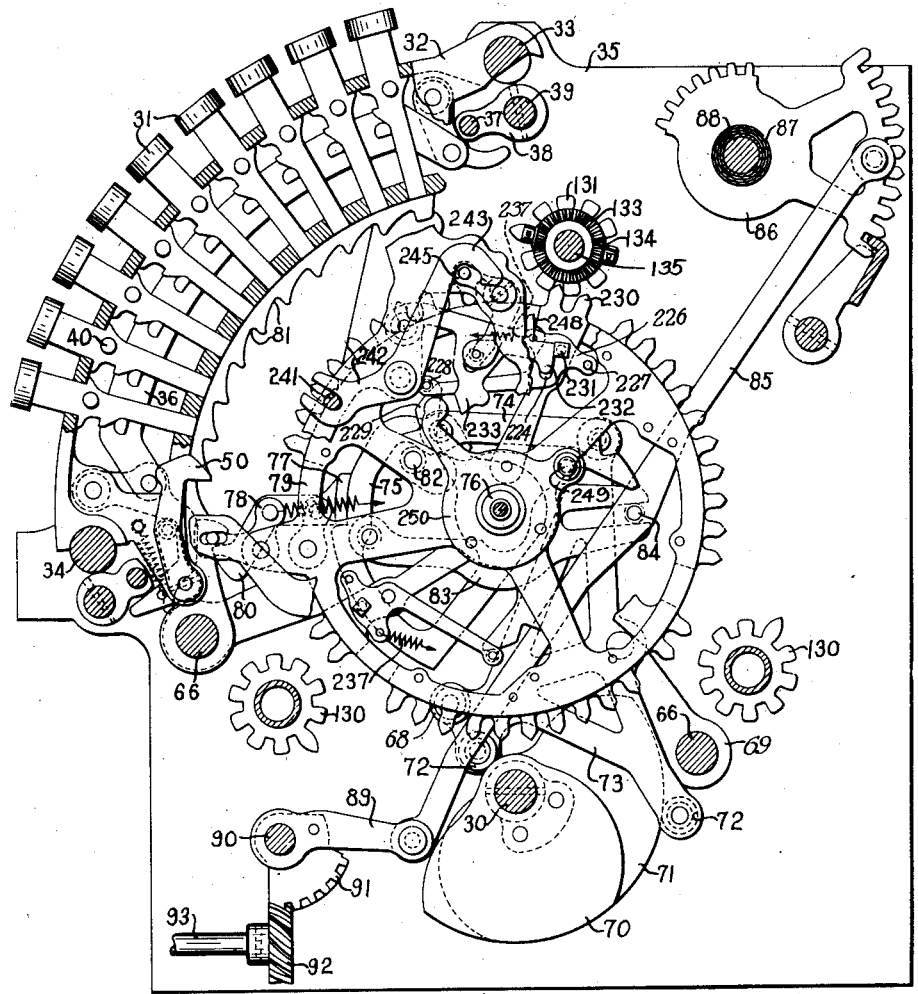
Fig. 1 is a section taken through the machine just to the right of the units bank of amount keys.

The invention is shown applied to a machine of the general type, shown and described in the following Letters Patent of the United States to W. A. Chryst, No. 1,230,864, issued June 26, 1917, and F. L. Fuller, No. 1,242,170 and No. 1,394,256, issued October 9, 1917 and October 18, 1921, respectively and to the present inventor, No. 1,602,596 and No. 1,619,796 issued October 12, 1926 and March 1, 1927, respectively.

In machines of this type having an adding and subtracting totalizer, the occasion may arise when a larger amount will be subtracted from a smaller one. This subtraction will leave a negative balance on the subtracting wheels. This balance, however, will be one cent short due to the fact that the subtracting wheels normally stand at nine, when the adding wheels stand at zero. It is usually necessary, therefore, to go through an extra operation to add "one" to the subtracting wheels before the negative balance is printed, and the subtracting wheels set to zero.

This invention makes it unnecessary to go through the extra operation mentioned, by providing a key, the depression of which trips a transfer mechanism in the units bank. The totalizer is so arranged that it stays in engagement with the actuators at the end of every operation except a resetting operation, and therefore, when the transfer mechanism in the units bank is tripped, its spring will rock the transfer arm and turn the units subtracting wheel one space, to add the fugitive "1" on the units wheel. The machine is then operated and the correct negative balance is printed, the subtracting wheels being left at zero.

Operating mechanism

This machine is designed to be operated by means of an electric motor. This motor and its driving connections are not shown herein, as they are of a well known type illustrated and described in Letters Patent of the United States No. 1,144,418 granted to Charles F. Kettering and William A. Chryst on June 29, 1915. It is thought to be sufficient to state that at each operation of the machine a single clockwise rotation is given to the main drive shaft 30 (Figs. 1, 3 and 9). In case of failure on the part of the motor, a crank handle is also provided by which the shaft 30 may be rotated.

Keyboard

*Amount keys.*—The amount keys 31 (Fig. 1) are identical with those shown and described in the above mentioned Patent No. 1,619,796. Therefore, only a very brief description thereof will be given herein. There are a plurality of banks of amount keys 31, the number of banks depending upon the registering capacity desired for any particular machine. Each of these banks is a duplicate of the other, and therefore, the description of one will suffice for all. Each bank contains nine keys slidably mounted in a key frame 32, supported at its upper end on a rod 33 and at its lower end on a rod 34, which rods are mounted in the machine side frames 35.

These keys are depressible, and when depressed, are retained in such position by a detent bar 36, which carries a plurality of studs co-operating with shoulders on the keys. The keys are released near the end of each operation due to the swinging bail 37, carried by a plurality of arms 38, (only one of which is shown) fast on a release shaft 39, which contacts with the projecting end of a link supporting the upper end of the detent bar 36. Near the end of the operation, the release shaft 39 is rocked counter-clockwise and causes the bail 37 to force all of the detent bars 36 downwardly far enough to free the shoulders on the keys from the studs carried by the detent bars. When this occurs, the keys are returned to their undepressed position, by springs, not shown, which bear against pins 40 projecting from the sides of the keys.

Control keys

In addition to the banks of amount keys 31, there are, in machines of this type, usually three banks of control keys. The function of these keys is to select and control the various totalizers during operations of the machine. In the present application, only one bank of these control keys is shown. This bank will be known herein as the "balance bank", as it is this bank which controls the positioning of the adding and subtracting totalizer. This bank contains five keys. The three upper keys 45 thereof are adding keys, that is, they will select the adding side of the adding and subtracting totalizer for operation, while the two lowermost keys 46 are the subtracting keys. All of these keys are slidably mounted in a key frame 32, similar in construction to the key frame 32 above described in connection with the amount keys 31. When depressed, these keys are so held by a detent bar 47, which has projections co-operating with studs projecting from the sides of the keys. The keys are released at the end of an operation by the counter-clockwise movement of the release shaft 39, which causes an arm 48 fast thereon, to co-operate with a projection 49 of a link supporting the upper end of the detent bar 47 in a manner which is well known in the art.

Each bank of keys, both amount and control keys, is provided with what is known in the art as a zero stop pawl 50. The function of this pawl as is well known is to disconnect the latch of the differential mechanism from its driver which will be presently described, in its zero position in case no key in the corresponding bank is depressed. However, when a key in any of the banks is depressed, its corresponding zero stop pawl is rocked to an ineffective position so that it will have no effect whatever on the differential latch.

Normal release mechanism

This machine is so designed that it may be released by the depression of any of the five keys in the balance bank (Fig. 3) in conjunction with a motor bar, not shown herein, but which is shown in applicant's Patent No. 1,602,596 to which reference has been made. The description will proceed as though the balance bank keys were the sole releasing means, as it is well understood that such might be the case. Co-operating with the keys of this bank is a control bar 51, which has a projecting lug 52 formed with an inclined edge co-operating with each of the keys. At its upper end the control bar 51 is pivotally supported by an arm 53 (Fig. 2), which is in turn pivoted to the key frame. When any one of the keys in the balance bank is depressed, the control bar 51 is rocked downwardly. This rocks the arm 53 clockwise about its pivot. The arm 53 carries a pin 54, which normally contacts with an upwardly projecting arm 55 of a locking yoke 56, loosely mounted on a shaft 57. The locking yoke 56 carries a pin 58, embraced by the bifurcated ear 59 on one arm of a releasing yoke 60, also loose on the shaft 57. The releasing yoke 60 has a projecting arm 61 which normally lies in the path of a half-round stud 62, carried by an arm 63 fast on the release shaft 39. The release shaft 39 normally tends to rock in a clockwise direction, as viewed in Fig. 2, under the influence of a powerful spring which is not shown in this application, but which is very well known in the art. Said spring is shown in the above mentioned Shipley Patent No. 1,619,796.

The movement of the release shaft 39 is, however, normally prevented by the engagement of the arm 61 of the releasing yoke 60 with the stud 62. When any one of the keys 45, 46 in the balance bank is depressed, the arm 53 is rocked clockwise and the pin 54 rocks locking yoke 56 counter-clockwise about the shaft 57. As this yoke 56 is connected by the pin 58 to the releasing yoke 60, it will also be rocked in a counter-clockwise direction, thereby moving the arm 61 thereof from in front of the stud 62. This permits the release shaft 39 to be rocked by the above mentioned spring, in order to complete the motor circuit and cause the motor to drive the mechanism of the machine in a manner well known in the art. The depression of the key in the balance bank will, as above noted, rock the locking yoke 56 counter-clockwise, and this locking yoke carries a hooked arm 64, which normally lies just above a shoulder on an arm 65, also fast on the release shaft 39. It can be seen from Fig. 2 that the hooked arm 64 will also be rocked out of the path of the shoulder of the arm 65, at the same time that the arm 61 is rocked from in front of the stud 62, thereby permitting the movement of the release shaft 39 to its releasing position. The reason for the use of the hook 64 and associated parts is fully set forth in the Shipley Patent No. 1,602,596 supra. This construction is standard and for this reason the hook is shown even though only one control bank is shown.

*Amount differential mechanism*

The differential mechanism used in the present machine is exactly the same as that shown and described in the above mentioned patents. Therefore, only a brief description thereof will be given herein. The differential mechanism includes a series of units, there being one unit appropriate to each bank of keys. As these units are duplicates one of another, it is thought to be sufficient to describe one.

Each of the differential units (Fig. 1) is driven by a pair of cams 70 and 71. These cams co-operate with rollers 72, carried by a Y-shaped lever 73, pivoted to the differential supporting frame 69. The differential unit supporting frames 69 are mounted on two rods 66, supported by the machine side frames 35. At its upper end the Y-shaped lever 73 is connected by a link 74 to a driving segment 75, loose on a bearing 76, supported by the differential unit frame 69. The driving segment 75 has a shoulder formed thereon, with which a latch 77 normally co-operates. This latch is supported by a pivoted arm and a bell crank lever 78, which are, in turn, pivotally mounted on a differentially movable actuator 79, loose on the bearing 76. The rotation of the cams 70 and 71 causes the differential driving segment 75 to be rocked first clockwise and then counter-clockwise to its normal position. On the clockwise movement of this segment, the differentially movable actuator 79, which is locked to the driving segment 75, is carried therewith until the forward end of the bell crank lever 78 contacts with the inner end of whichever one of the keys 31 is depressed. When this occurs the bell crank lever 78 is rocked counter-clockwise, thereby disengaging the latch 77 from the shoulder of the driving segment 75, and causing the forward end 80 of the latch to engage one of a series of notches 81, formed on the inner concave edge of a latch bar carried by the differential unit supporting frame 69. The differentially movable actuator 79 is therefore, stopped in a position corresponding to the key depressed, whereas the driving segment 75 continues to its full extent of movement. Upon the return movement of the driving segment, a flat surface on the interior thereof co-operates with a stud 82 on the differentially movable actuator 9, in order to return this member positively to its normal position. In case a key 31 is not depressed, the zero stop pawl 50 disengages the latch 77 from the segment 75 at the zero position, thus causing the differential actuator 79 to be set at said position. A beam 83 is pivoted at its left hand end to the differentially movable actuator 79 and at its right hand end is bifurcated and surrounds a roller 84, carried by a differential link 85. The adjusting beam is operated by the differential actuator and by a roller 68 on the Y-shaped lever 73. At its upper end the differential link 85 is pivoted to a segment 86 fast on one of a plurality of sleeves 87, supported on a shaft 88. At its lower end the differential link 85 is pivoted to an arm 89, secured to a spiral segment 91, loose on a rod 90 supported in the side frames of the machine. This spiral segment co-operates with a spiral pinion 92 fast on a printer shaft 93. It is apparent that the link 85 will be set differentially by the movement of the adjusting beam 83, and the upper end of the link 85 will cause the proper indicator, not shown in this application, to be selected in accordance with the key depressed. The lower end of the differential link, which co-operates with the spiral segment and the spiral gear 92, will adjust the proper type carrier, (not shown herein), in accordance with the key depressed.

Control bank differential mechanism

The differential mechanism for the control bank is shown in Fig. 3 and is very similar to that just described for the amount differential mechanism, except that as the control differential does not drive any totalizer wheel, but simply selects the totalizers for operation, there is no driving rack employed in connection with this differential unit. Briefly described, the control differential mechanism consists of a driving segment 100, rocked first clockwise and then counter-clockwise by a link 101, a Y-shaped lever 102, and a pair of cams 103 and 104, which cooperate with the Y-shaped lever.

Pivoted on the bearing 76 for this bank is a differentially movable member 105, which carries a latch 106 normally in engagemennt with a shoulder on the drivinng segment 100. The differentially movable member 105 will move clockwise with the driving segment during the first part of the operation until the forward end of the bell crank lever 107, which supports the latch 106 contacts with the inner end of whichever one of the keys 45, 46 has been depressed, whereupon the latch 106 will be disconnected from the shoulder on the driving segment 100 and will remain in the position to which it has been adjusted, until the counter-clockwise movement of the driving segment 100 brings a surface 108 thereon into engagement with a pin 109, carried by the differentially movable member which will thereupon return this member to its normal position.

The differential member 105 has pivoted thereto a beam 110, bifurcated at its rear end to cooperate with a stud 111, carried by a differential link 112, identical with the differential link 85 previously described. At its lower end the differential link 112 is pivoted to an arm 113, secured to a spiral segment 115, loose on the rod 90. The spiral segment 115 meshes with a spiral pinion 116 fast on a printer shaft 117 which, through the above described connections, will be differentially positioned in accordance with the key depressed, in order to position the proper type carrier, as shown in the patents referred to. At its upper end the differential link 112 is pivoted to a segment 118 fast on the shaft 88. This segment and the shaft will be differentially positioned in accordance with the key depressed, and through mechanism which will be hereinafter described, will select either the adding or the subtracting side of the adding and subtracting totalizer for engagement with the amount differential actuators.

Totalizers

This machine is provided with two regular totalizer lines such as are shown and described in detail in the Fuller and Shipley patents above mentioned. It is not believed to be necessary to give a detailed description of these totalizers in this application. Each of these totalizer lines consists of a hollow tube, (Fig. 1), upon which is loosely mounted a plurality of totalizer wheels 130. The totalizer wheels on each line are divided into a plurality of groups, there being one group for each denomination, all of the unit wheels being in one group, all of the tens in another group, etc.

In order to select any totalizer for operation, the entire line is shifted laterally to bring the corresponding totalizer wheel in each group into cooperative relationship with its actuator. Engaging mechanism is provided which will then engage the selected totalizer with the actuators, so that the totalizer wheels may be rotated to the desired extent. All of this mechanism is old in the patents to which reference has been made.

In addition to the two regular totalizer lines, this machine is provided with an upper totalizer line, which carries an adding and subtracting totalizer, substantially the same as that shown and described in the above mentioned Fuller Patent No. 1,242,170. This totalizer consists of a plurality of units, and each unit has an adding wheel 131 (Figs. 1 and 15), and a subtracting wheel 132. The subtracting wheels 132 mesh with the differential actuators 79 when the link 112 of the balance bank is in the position shown in Fig. 3. This wheel 132 has been omitted from Fig. 1. Fast to the side of each totalizer wheel 131 and 132 is a bevel gear 133, and cooperating with the two adjacent gears are two bevel pinions 134. It is apparent that with this construction, when either of the totalizer wheels 131 or 132 is rotated, the other wheel of the unit will be rotated to a like extent in the opposite direction. In order, therefore, to accomplish a subtracting operation, all that is necessary is to align the subtracting wheels 132 with the differential actuators 79 and drive these wheels to the extent appropriate to the keys depressed. The adding wheels 131, being connected through the above described gears 133, 134 to the subtracting wheels, will be rotated reversely to the same extent.

As shown in Fig. 15, the adding and subtracting units are loosely mounted on a shaft 135, which is supported at its right hand end, as viewed in this figure, in a frame 136, and at its left hand end in a frame 137. Frames 136 and 137 are slidably mounted on a shaft 138, which is supported at its ends in cam plates 139 and 140, secured to the side frames 35 of the machine.

Either the adding or the subtracting side of the adding and subtracting totalizer is selected for operation by the depression of the keys 45 in the balance bank, shown in Fig. 3. As above noted, the three uppermost keys select the adding side of the adding and subtracting totalizer, while the two lower keys 46 select the subtracting side thereof. This selection is accomplished as follows.

The link 112 (Fig. 3) appropriate to this bank of keys is differentially positioned in accordance with the key depressed. This link as previously stated is pivoted to the segment 118 fast on the shaft 88. Near the opposite end of the shaft 88 there is secured an arm, not shown, to which a link 141 (Fig. 15) is pivoted. The lower end of the link 141 is connected to a projecting ear on a hub 142, loosely mounted on a stud 143, supported by the left hand side frame 35 of the machine.

Integral with the hub 142 is a selecting cam 144, which has two straight grooved sections laterally offset relatively to each other and connected by a curved section. Cooperating with the groove 145 of this cam is a roller 146 carried by a downwardly projecting pin 147 on the slidable totalizer frame 136, which supports the right hand end of the adding and subtracting totalizer, as viewed in Fig. 15. As shown in this figure, the adding and subtracting totalizer is in its normal position wherein the subtracting wheels 132 are in alignment with the actuators 79. It is apparent, however, that when the selecting cam 144 is rotated from the position shown, the curved intermediate section of the cam will slide the adding and subtracting totalizer towards the left a sufficient distance to bring the adding wheels 131 of the adding and subtracting totalizer into co-operative relation with the actuators 79.

The selecting cam 144 is adjusted differentially in accordance with the key depressed in the first control or balance bank. If either of the first two keys 46 is depressed, the cam will remain in the normal position shown, and therefore, there will be no lateral movement of the totalizer. If, however, either of the three upper keys 45 is depressed, the cam will shift the roller 146 to the left and this movement will position the adding wheels 131 of the totalizer in alignment with the actuators, as above described.

*Totalizer engaging mechanism*

A portion of the mechanism used in this machine to engage the adding and subtracting totalizer with the differential actuators is substantially the same as that previously shown and described in the above mentioned Fuller Patent No. 1,242,170, and therefore, only a very brief description of this part of the engaging mechanism is thought to be necessary.

Connected by one arm of a lever 180 to the totalizer supporting shaft 138 in a manner which will be hereinafter described, is a downwardly extending floating link 160, (Fig. 9), which at its lower end, carries a pin 161 projecting through a substantially L-shaped slot 162 formed in a stationary plate 163, supported by the rods 66. Said pin 161 also co-operates with a hook 164 of a totalizer engaging spider 165 loosely mounted on a stud 159 supported by the plate 163. It is evident that the pin 161 may occupy a position within the hook 164, as shown in Fig. 9, or may be withdrawn therefrom into a portion 158 of the slot 162. When in the latter position, it is evident that the movement of the spider 165 will have no effect on the totalizer line appropriate thereto.

The means by which this pin 161 is positioned either into or out of engagement with the hooked arm 164 of the spider 165 is old in machines of this type, and it is not shown and described herein. Reference may be had, however, to the above mentioned Fuller Patents Nos. 1,242,170 and 1,394,256 and also the Shipley Patent No. 1,619,796 each of which describes this mechanism. It may be said that when the pin 161 is in engagement with the hook 164, the totalizer line appropriate thereto, which, in this case, is the adding and subtracting totalizer, will be engaged with the differential actuators 79. During every operation of the machine, the totalizer engaging spider 165 is rocked first clockwise and then counter-clockwise to its normal position, for the purpose of engaging the selected totalizer line. This engaging movement of the spider 165 is accomplished by the following mechanism.

The spider 165 carries a pin 166 which co-operates with a notch 167 formed in one arm of a pitman 168. At its left hand end the pitman 168 has a slot 169, which surrounds a control pin 170 adjustable by a total lever 215 (Fig. 8) through mechanism not herein shown but fully disclosed in the prior patents referred to. At its right hand end the pitman 168 is pivoted to a lever 171, Figs. 9 and 11, pivotally mounted on the plate 163. The lever 171 carries two rollers 172 and 173, co-operating with cams 174 and 175, respectively, fast on the main drive shaft 30 of the machine. These cams are so formed that at about the middle of a cycle of operation of the machine, the lever 171 is rocked first clockwise and then counter-clockwise to its normal position. As the notch 167 of the pitman co-operates with the pin 166 of the spider 165, it is evident that the movement to the right of the pitman 168 will rock the spider 165 clockwise, and the movement of the pitman 168 to its normal position will return the spider 165 to its normal position, as shown in Fig. 9.

For reasons hereinafter explained, it is necessary that, on all operations except resetting operations, the adding and subtracting totalizer be left engaged with the actuators 79 at the end of an operation of the machine. It is so shown in Fig. 9. This result is obtained by providing a latch mechanism which will latch the adding and subtracting totalizer to the engaging mechanism when desired, and disengage the engaging mechanism from this totalizer at the proper time. The construction of this latching mechanism is shown in Figs. 9, 10, 12, 13, 14 and 15.

The upper end of the floating link 160 is pivoted to a lever 180 best shown in Fig. 14. This lever is loosely mounted on the shaft 138, which supports the adding and subtracting totalizer frame. Pivoted to the other end of the lever 180 is a catch 181. A spring 179 stretched between a pin on the catch and an ear on the lever 180 tends to rock the pawl 181 counter-clockwise. The catch 181 has a notch 182 formed therein, adapted to take over a pin 183 carried by a lever 184, shown in Figs. 12, 13 and 15. The opposite end of the lever 184 is pivoted to one end of a link 185, which at its right hand end carries a flanged stud 186 projecting through a slot 187 in an arm 188, secured to a shaft 189, supported by the machine side frames.

The lever 184 is secured to the end of the totalizer frame supporting shaft 138 and has a roller 190, (see also Fig. 9), which operates in a cam slot 191 formed in the cam plate 140 secured to the side frame of the machine as previously described.

In Figs. 9 and 10, the parts are shown in the positions which they occupy at the end of a normal adding operation of the machine; that is, the catch 181 is disengaged from the pin 183, (Fig. 10) on the lever 184 and the totalizer, (Fig. 1), is in engagement with the differential actuators 79. With the totalizer in this position, the end of the totalizer frame supporting shaft 138 rests in the lower end of a seat 148 formed in the plate 140, and the roller 190 lies in the lower end of the cam slot 191 in this plate 140. Normally in engagement with the rear side of the flanged stud 186 is a hooked arm 192 loosely mounted on the shaft 189. This hooked arm 192 has a hub which is connected by mortise and tenon to a hub 193 rigidly secured to an arm 194 which is also loosely mounted upon the shaft 189. Pivoted to the arm 194 is the upper end of a link 195 (Figs. 9, 12 and 13), which, at its lower end, is pivoted to the right hand end of a lever 196, loosely mounted on a stud 197 supported by the side frame 35. At its left hand end the lever 196 carries a roller 198, which lies in a cam groove 199 formed in the side of a gear 200 fast on the main drive shaft 30 of the machine.

At the beginning of every cycle of operation, the walls of the cam groove 199 rock the lever 196 counter-clockwise and then immediately rocks clockwise to normal position. The counter-clockwise movement of the lever 196 raises the link 195, and through the arm 194, hub 193 and hooked arm 192, pushes the stud 186 and the link 185, relatively to the slotted arm 188 toward the left, as viewed in Fig. 9, to the position shown in Fig. 13, thus rocking the lever 184 clockwise which moves the roller 190 into the upper end of the cam slot 191, thereby forcing the ends of the totalizer frame supporting shaft 138 to rise out of their seats 148 in the plates 139, 140 and disengages the adding and subtracting totalizer from the differential actuators 79. As the lever 184 rocks clockwise, the pin 183 carried thereby, contacts with the flattened end 201 of the catch 181, and rocks this catch slightly clockwise against the tension of the spring 179 until the pin 183 passes off the end 201 of the catch, whereupon the spring 179 rocks the catch counter-clockwise and the notch 182 engages the pin 183, thereby locking the lever 180 to the lever 184 as shown in Fig. 13.

Now, when the totalizer engaging spider 165 rocks clockwise, as above described, to engage the totalizer with the actuators 79, the floating link 160 is pulled downwardly, and as the lever 180 is now connected through the catch 181 to the lever 184, secured to the totalizer frame supporting shaft 138, the totalizer is rocked into engagement with the actuators. Before this engagement takes place the actuators are positioned in accordance with the amount keys depressed, and after the engagement has been effected, the actuators are returned to their normal home positions, thereby rotating the totalizer wheels to a corresponding extent. The parts are now in the positions substantially as shown in Fig. 12, except that in Fig. 12, the parts are shown in the positions they occupy during the second cycle of a read and reset operation, at a time when the hooked arm 192 has been advanced for the second time.

In an item entering operation, such as is now under discussion, the hooked arm 192 is advanced in counter-clockwise direction at the very beginning of the operation of the machine, and is then restored in clockwise direction to its home position, after which the cams 174, 175 (Fig. 11) operate the pitman 168 to turn the spider 165 in clockwise direction and then restore the spider to its home position.

The lever 180, when rocked by the spider 165 in counter-clockwise direction, to rock the lever 184 and engage the totalizers with their actuators 79, causes the lever 184 to restore the link 185 and its stud 186, from the position shown in Fig. 13, to that shown in Fig. 9, the stud 186 idly traversing the slot 187 in the arm 188.

It will be seen that the spider 165, on its clockwise rotation, draws the pin 161 of the floating link 160 from the upper end to the lower end of the slot 162.

The end 223 of a lever 220 connected by a yoke 214 (Fig. 15) with the slotted arm 188, normally lies in the path of the end of the link 160, which strikes the end 223 and rocks the lever 220 and its slotted arm 188 counter-clockwise (Figs. 9, 12 and 13) to the position shown in Fig. 12 against the tension of the return spring 222. The slotted arm 188 on this counter-clockwise travel, forces the stud 186 and the rear end of the link 185 upwardly, as shown in Fig. 12, the hooked arm 192 having been restored to and remaining in its home position.

As the slotted arm 188 rocks counter-clockwise, relatively to the stud 186 on the link 185, it fits the offset rear end 225 of its slot over the stud to rock the latter and the rear end of the link upwardly out of the path of the hooked arm 192.

Near the end of the operation of the machine, the cams 174, 175 (Fig. 11) rock the spider 165 counter-clockwise to return the floating link 160 and its lever 180 to normal position after the actuators 79 have been returned to their normal positions.

The spring 222 cause the lever 220 to follow the link 160 on its return, the slotted arm 188 of the lever 220 returning clockwise to its normal position and lowering the stud 186 and link 185 to replace the stud in the path of the hooked arm 192.

In item adding operations, this rocking movement of the slotted arm 188 is ineffective, but in read and resetting operations, wherein the drive shaft 30 makes two complete cycles, such displacement of the stud 186 relatively to the hooked arm 192 has a function, as hereinafter explained.

The restoration of the floating link 160 and its lever 180, which constitutes part of the engaging mechanism, would disengage the totalizer wheels from their actuators 79, in the machines shown in the prior patents hereinbefore referred to.

But in the present invention, it is desirable to leave the adding and substracting totalizer in engagement with the actuators at the end of the adding operation, and therefore, means must be provided to disconnect the totalizer from the engaging mechanism before the engaging mechanism returns to its normal position. This is accomplished in the following manner. The release shaft 39, as previously stated is rocked clockwise at the beginning of an operation of the machine. Just before the end of this operation, the release shaft is rocked counter-clockwise slightly past its normal position, and then clockwise to its normal position. The means for rocking this shaft is shown in the Fuller patents referred to. Adjacent to the engaging mechanism, the release shaft has secured thereto an arm 205 (Figs. 9, 10, 12, 14 and 15) which is adapted to co-operate with a pin 206, carried by a plate 207, riveted to the side of the catch 181 on the lever 180. When the release shaft 39 rocks counter-clockwise as above noted, the release arm 205 thereon comes into contact with the pin 206 on the plate 207 carried by the catch and rocks the catch 181 clockwise until the notch 182 of the catch is out of engagement with the pin 183 of the lever 184. Fig. 14 shows the catch 181 just after it has been raised out of engagement with the pin 183 by the release arm 205. Shortly after this disengagement takes place the spider 165 is rocked counter-clockwise to its normal position and through the floating link 160, the lever 180, which carries the catch 181, is rocked to its normal position as shown in Fig. 9, leaving the totalizer in engagement with the actuators.

*Total taking operations*

There are two total taking operations known as the reading and the resetting or total operations. During each total taking operation the main cam shaft 30 is given two complete rotations or cycles of movement. The reading operation consists of engaging the totalizer with the actuators, turning the totalizer wheels backwardly to their zero positions under control of the wheels themselves, printing the amount which stood on the totalizer wheels, and then returning this amount to the totalizer wheels, leaving them in the condition in which they were at the beginning of the operation. The resetting operation consists in engaging the totalizer wheels with the actuators, returning the totalizer wheels to zero, and then disengaging the totalizer wheels from the actuators in order that the totalizer wheels may remain at zero. The first operation to be described is the reading operation.

This machine is provided with a total lever 215, Fig. 8, made integral with a slotted disk 216. This mechanism is partially shown in Fig. 8, but as it is very old and well known in the art, no detailed description of the total lever and its co-operating mechanism is thought to be necessary herein.

When a reading operation is to take place, however, the total lever is moved upwardly from its normal adding position one, two, or three steps, depending upon which of the totalizer lines is to be engaged. As, in the present instance, we are considering the adding and subtracting totalizer only, it may be said that in this case, the total taking lever is moved to its first position above its normal position. During the first part of the first cycle of said reading operation the link 185 is moved toward the left (Fig. 9) by the hooked arm 192 and its co-operating mechanism driven by the cam groove 199 in gear 200. The disengages the adding and subtracting totalizer from the actuators and at the same time latches the lever 180, through the pawl 181, to the lever 184 on the totalizer frame shaft 138 in the manner above described. The cams 174, 175, lever 171 and link 168 then rock the spider 165 clockwise whereby said totalizer is again engaged with the actuators 79. The pitman 168 is now in its right hand position, and the mechanism (not shown) connected with the control pin 170 is now operated by the machine, as described in the Fuller Patents Nos. 1,242,170 and 1,394,256 and the Shipley Patent No. 1,619,796 referred to, which causes the pitman 168 to be rocked in a counter-clockwise direction about its pivot to disengage the notch 167 from the pin 166 on the spider 165.

The next movement of the link 168 to the left is now an idle one and the totalizer remains in engagement with the actuators. The first cycle of movement of the shaft 30 is now completed and said shaft immediately makes a second cycle of movement.

However, as will be hereinafter described in detail, the roller 186 (Fig. 9) is moved so that the hooked arm 192 will have no effect on the link 185, thus permitting the adding and subtracting totalizer to remain in engagement with the actuators and at the same time preserving the latched coupling between the lever 180 and the shaft 138. Therefore, at the beginning of the second cycle, the movement of the lever 196 and link 195 does not disengage the totalizer from the actuators. As the lever 171 is rocked clockwise during this second cycle, the link 168 being still disengaged from the pin 166, moves idly to the right. The link 168 is then rocked clockwise and its slot 167 again engages the pin 166. This is accomplished by the means illustrated and described in the last mentioned Fuller and Shipley patents.

The lever 171 is now rocked counter-clockwise to its home position, which moves the link 168 to the left, thus rocking the spider 165 counter-clockwise to its home position. This movement of the spider 165 rocks the lever 180 clockwise, but the lever 184 is not rocked because just prior to the movement of the spider 165, the release shaft 39 was rocked counter clockwise and its arm 205 engaged the pin 206 and unlatched the pawl 181 from the pin 183 on the lever 184. Therefore, since this lever 184 is not coupled to the lever 180 the adding and subtracting totalizer remains in engagement with the actuators at the end of the reading operation.

The total lever 215 is, after the two cycles of movement have been completed, moved counter-clockwise (Fig. 8) to its adding position.

During the above described reading operation the adding and subtracting totalizer remains in engagement with the actuators throughout a portion of the first cycle of operation, and all of the second cycle. During this period, the totalizer wheels are reset to zero the amount is printed and then put back on the totalizer, in the manner usual in machines of this type.

There is a slight difference in the operation of the above described parts when a resetting operation is to take place.

On resetting operations the totalizer is disengaged from the actuators after the totalizer wheels have been reset to zero. In order to accomplish this, the following mechanism is provided. On a resetting operation, the total lever 215 (Fig. 8) is moved to its first position below its adding position. This rocks the pitman 168 counter-clockwise through the stud 170 and connected parts (not shown) far enough to disengage the notch 167 therein from the pin 166 of the spider 165. At the beginning of the first cycle of operation the link 185 is moved to the left by the hooked arm 192 to disengage the totalizer from the actuators, and at the same time, latch the totalizer with the regular engaging mechanism by engaging the pawl 181, on the lever 180, with the pin 183 on the lever 184.

The pitman 168 now moves idly to the right, and it is then given a further counter-clockwise movement by the mechanism shown and described in the last mentioned Fuller and Shipley patents, which engages the notch 217 with the pin 218 on the spider. Therefore, when the pitman 168 is returned to the left to its normal position near the end of the first cycle of a totaling operation the spider 165 is rocked clockwise and engages the totalizer with the actuators 79 in the regular manner. During the operation of engaging the totalizer wheels with the actuators, the stud 186 is shifted from the path of movement of the hooked arm 192 so that, at the beginning of the second cycle of the total taking operation, the hooked arm has an idle travel from and return to its home position.

The actuators 79, as they advance at the beginning of the second cycle of a totaling and clearing operation, turn the totalizer wheels meshed therewith, in reverse direction to their zero positions, and as the second cycle is approximately half-way completed, the cams 174, 175 shift the pitman 168 once more to the right and rocks the spider 165 counter-clockwise to its normal position, thereby disengaging the totalizer from the actuators, while the totalizer wheels are in their zero positions.

Near the end of the second cycle of the operation, the release shaft 39 is rocked as is usual, but the arm 205 will not engage the pin 206 and unlatch the totalizer as in reading operations. The reason is because the totalizer is disengaged, during resetting operations, before the release shaft 39 is moved, and therefore the pin 206 has been carried out of the path of movement of the arm 205. Also near the end of the second cycle of the operation, the pitman 168 is rocked to disengage its notch 217 from the pin 218 on the spider 165 by mechanism shown in the last mentioned Fuller and Shipley patents, and when the total lever 215 is returned manually to its normal adding position, the notch 167 of the pitman is once more engaged with the pin 166 on the spider. The totalizer is in disengaged position at the end of a resetting operation, but is connected to the regular engaging mechanism to be engaged at the regular time.

During both reading and resetting operations, the link 185 is moved to the left (Fig. 9) at the very beginning of the first cycle of operation, in order to disengage the totalizer from the actuators and latch the totalizer to the regular engaging mechanism. This as previously described, is accomplished by the hooked arm 192 which is connected to the arm 194 operated by the link 195, pivoted to the lever 196, which is, in turn, actuated by the cam groove 199 in the gear 200. During reading and resetting operations, as previously described, the machine goes through two cycles of operation, and therefore this hooked arm 192 is moved to the left at the beginning of the second cycle of operation, as well as during the first cycle.

As previously stated, means is provided for moving the stud 186 out of the path of movement of the hooked arm 192 before the beginning of the second cycle of operation, so that said arm 192 will have no effect whatever on the link 185. This is accomplished in the following manner.

The stud 186 normally moves in a concentric portion of the slot 187 in the arm 188. This arm is connected by a yoke 214 (Fig. 15) to a downwardly extending arm 220 (Figs. 9, 12, 13 and 15) which carries a laterally projecting pin 221 normally held in contact with the periphery of the plate 163 by a spring 222, stretched between a pin on said plate and the yoke 214. The arm 220 has an extension 223, which normally lies in the path of the lower end of the link 160. During the first cycle of operation, the hooked arm 192 begins its counter-clockwise movement about the shaft 189 at the very beginning of the operation of the machine, before the spider 165 is operated. Later during the first cycle of operation, however, when the spider 165 is rocked clockwise, the link 160 contacts the extension 223 of the arm 220, and rocks this arm and the arm 188 in counter-clockwise direction. The right-hand end 225 of the slot 187 is not concentric with the shaft 189, and therefore when the arm 188 rocks counter-clockwise the stud 186 is moved into the offset end 225 of the slot 187, which rocks the link 185 counter-clockwise about its pivot 190. This raises the stud 186 out of the path of movement of the hooked arm 192, and therefore the movement of said arm 192 at the beginning of the second cycle of operation is an idle one.

*Negative balance correction key*

If, during the operation of the machine, a greater amount is subtracted from a smaller amount, the remainder will be what is called herein, a negative balance. This negative balance will, however, be one cent short of the correct amount, as above pointed out in the early part of the specification.

It is sometimes desired to print such a negative balance and clear the totalizer wheels. It will be remembered that the balance bank has two keys 46 therein (Fig. 3). The lowermost one of these two keys is the regular subtraction key, which is depressed whenever a subtracting operation is to be performed. The upper one of these two keys will be known herein as the negative balance correction key. It is ordinarily impossible to depress this key for reasons which will be hereinafter pointed out. When this key is depressed, however, on a negative balance printing operation, it causes one unit to be added to the units totalizer wheel of the adding and subtracting totalizer, thereby correcting the amount on the negative wheel of this totalizer. This is accomplished in the following manner.

The regular transfer mechanism, such as is old in machines of this type, is used in connection with the units bank differential mechanism to add this one unit. This mechanism includes a transfer arm 230 (Fig. 1), pivotally mounted on the differentially movable actuator 79 for the units bank. This transfer arm is in the same plane vertically as the actuators for the units bank.

Pivoted to the arm 230 by a pin 224 are two levers 226, one on each side of said arm 230, the lever on the back side (Fig. 1) does not show because its outline is identical with the one on the front side. Said levers 226 are secured to each other by rivets 227 and are also connected by a pin 228 held in engagement with a projection 229 integral with the actuator 79, by a spring 237 stretched between the levers 226 and said actuator. This construction is illustrated and fully described in detail in the above mentioned Shipley Patent No. 1,619,796. During the clockwise movement of the actuator 79, the spring 237 locks the lever 226 to the projection 229 so that the arm 230 and said actuator move as a unit.

The front lever 226 has secured thereto a square stud 231, which normally abuts an end 232 of a transfer lever 233 mounted on the plate 69. As is fully described in the last mentioned Shipley Patent No. 1,619,796, when the actuator 79 moves clockwise to be set differentially, the transfer arm 230 remains stationary until the upper lefthand set of teeth (Fig. 1) on the actuator 79 closes the gap between said teeth and said arm. Then the arm 230 is moved with the actuator. This moves the square stud 231 away from the end of the transfer lever 233. Now as the actuator moves counter-clockwise to its zero position the square stud contacts with the end 232 of said lever 233 thus stopping the transfer arm 230 while the actuator continues its movement to zero. This stopping of the arm 230 takes place when there are no extra units to be added.

The transfer lever 233 normally tends to rock in a clockwise direction under the influence of a spring 234 (Fig. 4), but it is normally prevented from this clockwise movement by the engagement of a stud 235 carried by an arm 247 pivoted at 246, with a shoulder formed in a slot 236, in said lever 233. If during the operation of the machine, the stud 235 is moved off of the shoulder in the slot 236, the spring 234 will rock the transfer lever 233 clockwise a sufficient distance to remove the end 232 thereof (Fig. 1), from the path of movement of the square stud 231, and cause a shoulder 248 of the transfer lever to move into the path of said square stud 231. This shoulder 248 is, however, one-tooth space away from the end 232 of the lever, and therefore, when the parts, consisting of the actuator 79, the levers 226 and the transfer arm 230, return to their normal positions, the transfer arm 230 will move one step farther than in an operation in which no extra unit is added, thereby adding one extra unit.

In the present instance, it is desired to add "1" to the negative units wheel 132 of the adding and subtracting totalizer, and therefore, the regular transfer mechanism just described is placed on the units differential unit. In the normal condition of the parts, the units transfer arm 230 always comes to rest with the square stud 231 against the end 232 of the units transfer lever 233, and it is only when a negative balance is on the adding and subtracting totalizer that the transfer lever is rocked to permit the addition of an extra unit into the units totalizer wheel.

The tripping of the transfer lever 233 for the units order is not accomplished in the usual manner. It is the negative balance correction key 46 which, when depressed, trips the transfer lever 233 and permits the spring 237, to rock the transfer arm 230 one-tooth space, which brings the square stud 231 into contact with the shoulder 248. As the totalizer is normally left in engagement at the end of adding and reading operations, it can be seen that when the transfer arm 230 is rocked counter-clockwise by its spring upon the depression of the negative balance correction key 46, the negative units totalizer wheel is rotated one space, which corrects the negative balance, by adding one cent thereto.

The means whereby the depression of the negative balance correction key trips the transfer lever, will now be described. The negative balance correction key 46 carries a pin 238 (Fig. 4) adapted to cooperate with a notch 239 cut at an angle in a control segment 240, pivoted on the bearing 76, for the balance bank of keys. This control segment has slots appropriate to the three uppermost keys in this bank, but these slots are not cut at an angle, and therefore the depression of these keys has no effect on the control segment. When the negative balance correction key is depressed, however, the control segment is rocked counter-clockwise. The control segment carries a pin 241, which enters the bifurcated end of an actuating lever 242, pivoted to the differential unit supporting frame 69 for the first control bank.

The actuating lever 242, at its upper end, has a hook-shaped cam portion 243, which cooperates with a pin 244 on an arm 245, fastened to a shaft 246, journaled in and extending through the differential units supporting frames for the second and third control banks and the first amount bank. Fast on this shaft 246 in the plane of the first amount bank is a downwardly extending arm 247, which carries the stud 235, previously mentioned, for the purpose of normally holding the transfer lever 233 for this units bank in its raised position. It can be seen from Fig. 4 that when the negative balance correction key is depressed, and the control segment 240 is rocked counter-clockwise, the pin 241 carried by the segment rocks the actuating lever 242 counter-clockwise. The hook-shaped cam portion 243 of the actuating lever 242 engages the pin 244 and rocks the arm 245, shaft 246 and arm 247 slightly counter-clockwise a distance sufficient to disengage the stud 235 from the shoulder in the slot 236. The spring 234 thereupon rocks the transfer lever 233 clockwise a distance sufficient to move the end 232 thereof out of the path of movement of the square stud 231 (Fig. 1). The spring 237 as above described thereupon rocks the transfer arm 230 counter-clockwise one-tooth space which adds one unit to the negative units wheel 132 of the adding and subtracting totalizer, in order to correct the negative balance standing thereon.

The negative balance correction key 46 when depressed, rocks the segment 240 journaled on the hub 76 in counter-clockwise direction against the tension of a spring 275 (Figs. 3 and 5).

The locking bar 47 (Fig. 1) latches the negative balance key in depressed position until released by the finger 48 on the release shaft 39 near the end of the operation of the machine, whereupon the usual key spring (not shown) restores the negative balance correction key as the spring 275 rocks the control segment 240 in clockwise direction to its normal position.

The control segment 240 on its return, restores the actuating lever 242, so that the hooked end 243 of the latter frees the carry tripping arms 245, 247.

Thereafter, near the middle of the first cycle of operation, the driving segment 100 for the highest bank of transaction keys, which lies to the right of the first amount bank of keys, when near the upper limit of its travel, strikes a stud 249 (Fig. 1) on a transfer resetting lever 250 to cause the extended arm of the latter, the free end of which lies beneath the transfer lever 233, to restore the transfer lever a little past its normal position, all as fully explained in the prior patents cited.

As the transfer lever 233 restores its slot 236 (Fig. 4), aided by a coil spring (not shown) on the shaft 246, rocks the trip arm 247 in clockwise direction until the pin 235 of the trip arm lies beneath the shoulder in the slot 236 to latch the transfer lever in its normal position.

*Interlocking mechanism for negative balance correction key*

In order to prevent the depression of the negative balance correction key and the addition of the one cent to the units bank at any time except when a negative balance is actually on the subtracting wheels of the adding and subtracting totalizer, the following mechanism is provided.

Connected by a shouldered spacing sleeve 255 (Fig. 15) to the adding wheel of the highest order unit of the adding and subtracting totalizer, is a cam disk 256, which has fastened thereto a bevel gear 257. This gear is connected by a pair of bevel pinions 258 (only one of which is shown) to a bevel gear 259, attached to the side of a cam disk 260. The cam disks 256 and 260 are for the purpose of ringing a bell (not shown) whenever the totalizer wheels of the highest order on the adding and subtracting totalizer pass over zero, in order to warn the operator that such a condition exists in the machine. This mechanism is shown and described in the copending application of the present inventor, Serial No. 686,564, filed January 16, 1924, and reference may be made to this application for a description of this mechanism.

Fastened to the side of the cam disk 260 is a lock-releasing cam disk 261 (Figs. 5 and 15). This cam disk 261 cooperates with an arm 262, fast on a cross shaft 263, mounted at one end in a downwardly extending arm 264 of the totalizer supporting frame 136, and at its opposite end in an arm 265 (Figs. 6 and 15) of a casting 266, supported by the shaft 138.

Secured to the left hand end of this shaft 263, as viewed in Fig. 15, is a lever 267, (see also Figs. 3 and 5) connected to an arm 268 by a yoke 269. The yoke 269 normally lies in the path of the upper end of the pawl 271, pivoted at 272 to an arm 273 of the control segment 240, previously described. The pawl 271 cannot rock in a clockwise direction as the lower end thereof is in contact with a pin 274, carried by the arm 273. The pawl is held in contact with this pin by means of the segment restoring spring 275, attached to the pawl and to any convenient place on the frame.

It will be recalled that the totalizer supporting frames 136, 137 with the adding and subtracting totalizer and the totalizer shaft 135 are slidable axially of the supporting shaft 138 to bring the adding wheels 131 or the subtracting wheels 132 into alinement with the actuators 79. The present locking mechanism shifts with the totalizer.

It will be remembered also that when the negative balance correction key 46 is depressed, the detent 240 is rocked counter-clockwise about its pivot. It can be seen from Fig. 5, however, that this movement is prevented so long as the yoke 269 is in the path of the pawl 271. The yoke is shown in its home position in Figs. 3, 4, 5 and 15. When, however, during a subtracting operation, the adding totalizer wheels 132 pass through zero, the lock-releasing cam disc 261 (Fig. 5) contacts the end of the arm 262 and rocks this arm, the shaft 263, the lever 267, arm 268 and yoke 269 in counter-clockwise direction a sufficient distance to lift the yoke out of the path of the pawl 271 and permit the pawl 271 to pass beneath the yoke 269. This permits the depression of the negative balance correction key 46 so far as this mechaism is concerned. When the totalizer is axially shifted to bring the adding wheels 131 into cooperative relation with the actuators 79, the adding and subtracting totalizer is in a position to the left of that shown in Fig. 15, and when the totalizer is in this position, a projection 270 of the yoke 269 lies in the path of the pawl 271, even though the yoke 269 has been rocked counter-clockwise as above explained. This makes it impossible to depress the negative balance correction key 46 unless the negative wheels of the adding and subtracting totalizer are in cooperative relation with the differential actuators.

The lock-releasing cam disk 261 being connected through the shouldered sleeve 255 with the adding wheel 131 of highest order, turns with such wheel. The lobe of the releasing cam is so located relatively to the arm 262 on the cross shaft 263, that one step of advance of the releasing cam, which occurs when the total registered passes through zero, i. e. when the adding wheel of the highest order passes from "0" to "9" in a direction reverse to adding, will cause the lobe of the cam to bear against the arm 262 and remain in such position to hold the locking bail 269 out of the path of the pawl 271.

As the negative totalizer 132 is cleared, the adding wheels 131 are restored in adding direction to their "nines" positions, and the releasing cam 261 retraces its advance step and releases the yoke 269, whereupon a spring 254 (Fig. 5) returns the yoke 269 and connected parts to their normal effective positions.

As the releasing cam 261 is connected with the adding wheel of highest order, it is extremely unlikely that the capacity of the machine will be exceeded more than once in any one computation.

It is desirable to prevent the depression of the negative balance correction key unless the total lever 215 is moved to its first position below its adding position wherein the lever selects the adding and subtracting totalizer line for a resetting operation.

The means for preventing the depression of the key 46 until this lever 215 is moved, comprises a stop arm 280 (Figs. 4 and 8) fast on a shaft 281, supported by the differential unit supporting hangers 69. Also fast on the shaft 281 is an arm 282, which has a laterally projecting pin 283 extending through a slot 284 cut in the total lever disk 216. The lower edge of the slot 284 is recessed as shown in Fig. 8, and with the total lever 215 in its normal adding position, the pin 283 rests in this recess. With the parts in the positions which they occupy during adding operations, the stop arm 280 lies in the path of a pin 285, on the arm 273 of the control segment 240. As long as the end of the stop arm 280 is in the path of pin 285, the control segment cannot be rocked counter-clockwise and therefore, the negative balance correction key 46 cannot be depressed. When, however, the total lever 215 and its disk 216 are moved counter-clockwise to the first position below the adding position, to control the adding and subtracting totalizer on a resetting operation, the pin 283 is raised into the unrecessed portion of the slot 284, which rocks the arm 282, shaft 281 and stop arm 280 clockwise and removes the end of the stop arm 280 from the path of movement of the pin 285. This permits the counter-clockwise movement of the control segment 240, and therefore, the depression of the correction key 46.

It will be remembered that when the total lever 215 is moved to its first position above its normal position, the mechanism is controlled to print the amount on the adding and subtracting totalizer, but does not leave the totalizer wheels at zero. Provision is made for preventing the depression of the negative balance correction key 46 on such an operation of the adding and subtracting totalizer. This consists in lengthening the recess formed in the slot 284 so that when the total lever 215 is moved to its first position above its adding position the arm 282 is not rocked. Therefore the stop arm 280 remains in the path of movement of the pin 285 on the control segment 240, and the depression of the negative balance correction key is prevented. This means is provided for the following reason.

If it were possible to read the negative balance by pressing the negative balance correction key, the correct negative balance would be read and would then be returned to the totalizer. If, at a subsequent time, the negative balance is reset, the negative balance correction key would again be depressed, and this would add an extra unit to the units wheel of the totalizer, giving a wrong result on this wheel.

A means is provided for preventing the release of the negative balance correction key 46 by the manual key release. The manual key release is a device which is well known in machines of this type. One form is illustrated and described in a co-pending application for United States Letters Patent, Serial No. 687,305, filed by Bernis M. Shipley, the present inventor, on January 19, 1924. In the present application the manual key release includes the release shaft 39, the rod 37, the arm 48, (Figs. 1 and 3) previously described and a lever 278 (Fig. 7) which is secured to the release shaft 39. This is substantially the same as that illustrated and described in the previously mentioned Shipley Patent No. 1,619,796. A counter-clockwise movement of the manual key release shaft 39 by the lever 278 rocks said shaft 39 in counter-clockwise direction a sufficient distance to release any of the keys which have been depressed in case an error has been made. As the negative balance correction key when depressed, trips the transfer mechanism in the units bank and adds one to the negative units wheel of the adding and subtracting totalizer, it is not desirable to have this key released once it has been depressed, and therefore, the following mechanism is provided.

A catch 286 (Fig. 6) pivoted on the shaft 281 has a hook 287 adapted to embrace the shaft 263. This shaft is supported as above described, by the arms 265 and 264, which are, in turn, formed integral with the castings 266 and 136 and shifts up and down as the totalizer engages with and disengages from its actuators 79. The catch 286 has a nose 288, normally held in contact with the arm 273 of the detent 240 by a spring 289 stretched between a pin on the catch 286 and a pin on the arm 273 as shown in Fig. 6. When the negative balance correction key 46 is depressed and the control segment 240 is rocked counter-clockwise relatively to the catch 286, the nose 288 of the catch is rocked counter-clockwise by the spring 289 to a position behind the upper end of the arm 273 on the control segment 240. This prevents the release of the correction key.

When the machine is operated and the totalizer is disengaged at the beginning of the operation, the shaft 263 through its engagement with the hook 287 rocks the lever 286 in a clockwise direction far enough to raise the nose 288 above the upper end of the arm 273, and therefore, the negative balance correction key can be released at the end of the operation in the normal way.

Means is also provided for preventing the release of the machine by any key except the negative balance correction key when a negative balance is on the adding and subtracting totalizer, and after the total lever has been moved to the reset position for the adding and subtracting totalizer line.

It has already been described how the shaft 281 is rocked clockwise by the movement of the total lever 215 through arm 282 (Fig. 8) to the first position below its adding position. This clockwise movement of the shaft 281 (Fig. 7) rocks an arm 290, secured thereto, in clockwise direction. This arm 290 is bifurcated at its lower end to embrace a pin 291, carried by an arm 292, pivoted on a stud 293 mounted in the differential unit frame for the first control bank. The upper end 294 of this arm 292 normally lies beneath a shoulder 295 of a dog 296, loose on the shaft 281. The upper end of the dog 296 is square, and is normally just out of the path of a projecting ear 297 of the arm 65, previously described, which is fast on the release shaft 39.

The dog 296 carries a pin 298, which normally rests against an upwardly extending tail 299 of the yoke lever 267, previously described. It will be remembered that the lever 267 is rocked counter-clockwise whenever the negative side of the adding and subtracting totalizer passes through zero, and therefore when this occurs the tail 299 of this lever is rocked away from the pin 298 on the dog 296, and so far as this mechanism is concerned, permits the dog 296 to assume a position with the upper end thereof, beneath the ear 297 on the arm 65, thereby preventing the release of the machine. The movement of the total lever 215, as above described, rocks the arm 294 from beneath the shoulder 295 of the dog 296, and this completes the removal of the obstructions to the counter-clockwise movement of the dog 296, which thereupon assumes a position beneath the ear 297, and prevents the release of the machine.

The dog 296 normally tends to rock in a counter-clockwise direction, due to the action of a spring 300 (Fig. 7) stretched between a pin on an arm 301, which is pivoted on the shaft 281, but is connected to the arm 296 by a yoke 302, and any suitable point on the frame.

Therefore, it is plain that when there is a negative balance on the subtracting wheels 132, and an attempt is made to take a total thereof by shifting the total lever 215 without depressing the negative balance correction key 46, the machine is locked by the dog 296 against operation.

The negative balance key 46, however, when depressed, shifts the control segment 240 counter-clockwise, together with its angular arm 273, a pin 303 on the arm 273 striking the arm 301 connected by the yoke 302 to the dog 296, to rock the dog in clockwise direction to its normal position (Fig. 7), thereby withdrawing the upper end of the dog 296 from beneath the ear 297, so that the release shaft 39 can be rocked clockwise to release the machine.

*Operation*

The operation of the machine is very simple. It will be presumed that a positive balance stands on the adding wheels 131 (Figs. 1 and 15) of the adding and subtracting totalizer. A greater amount is set up on the keyboard and the lowermost key 46 (Fig. 3) in the balance bank is depressed. This selects the subtracting wheels 132 on the adding and subtracting totalizer for actuation, and the larger amount is subtracted from the adding wheels 131, thereby placing a negative balance on the subtracting wheels 132. This balance, however, is one cent short. In order to print the negative balance and to reset the negative wheels to zero, the total lever 215 (Fig. 8) is moved to its first position below its adding position and the negative balance correction key 46 (Figs. 3 and 4) is depressed. The depression of this key trips the transfer mechanism in the units bank, which immediately adds "one" to the units negative wheel 132 of the totalizer, and as the depression of this key also releases the machine (or permits release after the depression of a motor bar), the operation continues and the correct negative balance is printed, and the negative wheels 132 of the totalizer are set to zero. Before the next registering operation, it is, of course, necessary to give the machine a blank operation, which clears the adding side of the adding and subtracting totalizer, leaving these wheels 131 at "zero" and the negative wheels 132 at "nine."

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of a set of actuators, an adding and subtracting totalizer shiftable relatively to the actuators to locate the adding or the subtracting side of the totalizer in effective position, a negative balance correction key, means shiftable with the totalizer for preventing depression of said key whenever said totalizer is in adding position, said means being ineffective when said totalizer is in subtracting position and carries a negative balance.

2. In a machine of the class described, the combination of a shiftable adding and subtracting totalizer, a negative balance correction key, a pivoted yoke shiftable with said totalizer as the latter is shifted to its adding and subtracting positions, means for moving said yoke as the balance changes from positive to negative to render said key operative, when the totalizer is in subtracting position, and a projection on said yoke preventing depression of said key when the totalizer is in its adding position.

3. In a machine of the class described, the combination of an adding and subtracting totalizer, a negative balance correction key, an adjustable total control means, and means to render said key operative only when said total control means is in a certain position of adjustment.

4. In a machine of the class described, the combination of an adding and subtracting totalizer, a negative balance correction key, total control means for controlling the machine for sub-total and total taking operations, and means preventing the operation of said key when the machine is controlled for sub-total taking operations.

5. In a machine of the class described, the combination of an adding and subtracting totalizer, a negative balance correction key, total control means adjustable in opposite directions for controlling the machine to perform sub-total and total taking operations, means preventing the operation of said key when the total control means is adjusted to control the machine for sub-total taking operations, and means for moving said last mentioned means into ineffective position as the total control means is adjusted to control the machine for total taking operations.

6. In a machine of the class described, the combination of an adding and subtracting totalizer, a negative balance correction key, total control means adjustable in opposite direcitons for controlling the machine to perform sub-total and total taking operations, an obstructing member preventing the operation of said key when the total control means is adjusted to control the machine for sub-total taking operations, a cam moved by said total control means as it is adjusted to control the machine for total taking operations, and means operated by said cam for moving said obstructing member into ineffective position.

7. In a machine of the class described, the combination of an adding and subtracting totalizer, a negative balance correction key, an adjustable total control means, and means controlled by said totalizer for permitting the operation of said key only when said total control means has been adjusted into a certain position and said totalizer carries a negative balance.

8. In a machine of the class described, the combination of an adding and subtracting totalizer, a negative balance correction key, an adjustable total control means, means preventing the operation of said key when the balance on the totalizer is positive, means for moving said preventing means into ineffective position as the balance changes from positive to negative, a second means for preventing operation of said key, and means operated by the total control means as it is adjusted to control the machine for a total taking operation, for moving said last mentioned preventing means into ineffective position.

9. In a machine of the class described, the combination of an adding and subtracting totalizer, a negative balance correction key, an adjustable total control means, means for locking the machine against operation as it is being controlled for a negative balance total taking operation, and means operated by the operation of the negative balance key for moving said locking means into non-functioning position.

10. In a machine of the class described, the combination of an adding and subtracting totalizer, means for placing a negative balance on said totalizer, a bank of keys including a key, the operation of which will control the addition of one unit to said negative balance, a manual key releasing means, and means including a lever actuated upon depression of said key for preventing the release of said key by said manual key releasing means.

11. In a machine of the class described, the combination of a normally engaged adding and subtracting totalizer, a negative balance correction key, a control segment operated thereby, a lock for said control segment operable upon operation of said key, and means operated by said totalizer as it is disengaged for releasing said lock.

12. In a machine of the class described, the combination of an engageable and disengageable adding and subtracting totalizer, a negative balance correction key, means operable upon depression of said key for locking said key against operation, and means for moving said locking means into ineffective position as the totalizer is moved in one of its engaging and disengaging movements.

13. In a machine of the class described, the combination of an adding and subtracting totalizer, means for placing a negative balance on said totalizer, a total control means for controlling the machine for total and sub-total taking operations, a key, the operation of which will automatically add one unit to said negative balance, and means operated by said total control means for preventing the operation of the machine when it is adjusted for total taking operations and a negative balance has been placed on said totalizer, until after an operation of said key.

14. In a machine of the class described, the combination of a totalizer, actuators therefor, means for engaging said totalizer with said actuators, means for disconnecting said totalizer from said engaging means, and other means for disengaging said totalizer from said actuators.

15. In a machine of the class described, the combination of a totalizer, actuators therefor, a shaft for carrying the totalizer, an arm fast on said shaft, a pin carried by said arm, a hooked member adapted to cooperate with said pin, a lever for carrying said member, and means for rocking said lever to engage said totalizer.

16. In a machine of the class described, the combination of a totalizer, actuators therefor, a shaft for carrying the totalizer, an arm fast on said shaft, a pin carried by said arm, a hooked member adapted to cooperate with said pin, a lever for carrying said member, and means for disconnecting said hooked member from said pin to prevent the disengagement of said totalizer from said actuators.

17. In a machine of the class described, the combination of a totalizer, actuators therefor, a shaft for carrying the totalizer, an arm fast on said shaft, a pin carried by said arm, a hooked member adapted to cooperate with said pin, a lever for carrying said member, a shaft adapted to be rocked near the end of every operation, and an arm carried by said shaft which, when the shaft is rocked, will cooperate with said hooked member to disengage said member from said pin to prevent the disengagement of said totalizer from said actuators.

18. In a machine of the class described, the combination of a totalizer, actuators therefor, a regular means for engaging said totalizer and said actuators, means for disconnecting said regular means from said totalizer near the end of an operation, and a special means adapted to disengage said totalizer from said actuators near the beginning of an operation and, at the same time, connect said regular engaging means with said totalizer.

19. In a machine of the class described, the combination of an adding and subtracting totalizer, an engaging and disengaging means constructed to disengage the totalizer toward the end of each operation of the machine, and means for preventing said engaging and disengaging means from disengaging the totalizer in adding and sub-total taking operations.

20. In a machine of the class described, the combination of an adding and subtracting totalizer, an engaging and disengaging means constructed to disengage the totalizer toward the end of each operation of the machine, means for preventing said engaging and disengaging means from disengaging the totalizer in adding and sub-total taking operations, and means for disengaging said totalizer at the beginning of the succeeding operation.

21. In a machine of the class described, the combination of an adding and subtracting totalizer, an engaging and disengaging means constructed to first engage the totalizer and later to disengage the totalizer toward the end of each operation of the machine, means for preventing said engaging and disengaging means from disengaging the totalizer in adding and sub-total taking operations, means normally operable at the beginning of each cycle to disengage the totalizer, and means operable during a total taking operation to render said disengaging means ineffective after the totalizer has been engaged by said engaging and disengaging means.

22. In a machine of the class described, the combination with a plurality of sets of totalizers; a support for the totalizers; and a single set of actuators common thereto, and relatively to which the totalizers are shiftable to position one or another of the sets of totalizers in effective position; of means to engage the selected set of totalizers with the actuators, including a pair of companion levers carried by the totalizer support; a normally ineffective coupling between the companion levers; and means to actuate one of the levers, to effect the engagement of the selected set of totalizers with the actuators; and means to actuate the remaining lever to disengage the set of totalizers from the actuators and to render the coupling between the levers effective.

23. In a machine of the class described, the combination with a set of totalizers; actuators therefor, with which the totalizers are normally in engagement; and a lever connected with the totalizers; of means connected with the lever to operate the latter to disengage the totalizers from their actuators; a second lever connected with the totalizers; a normally idle coupling between the levers, which coupling is rendered effective by the operating means for first-named lever; and means operable upon the second-named lever to engage the totalizers with their actuators after the coupling is rendered effective.

24. In a machine of the class described, the combination with a set of totalizers; and actuators therefor; of means to engage the totalizers with and disengage them from their actuators; and separately and successively operable means to actuate the engaging and disengaging means.

25. In a machine of the class described, the combination with a set of totalizers; and actuators therefor; of a totalizer shifting lever, operation of which shifts the totalizers to engaged or disengaged position relatively to their actuators; separate drive means to shift the lever in opposite directions; and a normally idle coupling between one of the drive means and the lever, said coupling rendered effective by the operation of the other drive means.

26. In a machine of the class described, the combination with a set of totalizers; and actuators therefor; of a totalizer shifting lever, operation of which in one direction or the other, shifts the totalizers to engaged or disengaged position relatively to their actuators; a drive member to operate the lever in one direction; means carried by the totalizer shifting lever, adjustable into and out of the path of the drive member; a second drive member to operate the lever in the opposite direction; and means operated by the second drive member to displace the adjustable means relatively to the first-named drive member.

27. In a machine of the class described, the combination with a set of actuators; and a totalizer engageable therewith and disengageable therefrom; of separate drive means, one of which effects the engagement of the totalizer with its actuators, and the other of which effects the disengagement of the totalizers from their actuators.

28. In a machine of the class described, the combination with a set of actuators; and a totalizer engageable therewith and disengageable therefrom; of separate drive means, one of which effects the engagement of the totalizer with its actuators, and the other of which effects the disengagement of the totalizers from their actuators; and means controlled by one of the drive means to render the other drive means ineffective.

29. In a machine of the class described, the combination with actuators; and a totalizer engageable with and disengageable from the actuators; of means associated with the totalizer to effect such engagement and disengagement, including separate members; separate means to drive the separate members; a normally idle coupling between the members, and rendered effective by the operation of one of said members; and means to disable the coupling.

30. In a machine of the class described, the combination with actuators; and a totalizer engageable with and disengageable from the actuators; of means associated with the totalizer to effect such engagement and disengagement, including separate members; separate means to drive the separate members; a displaceable connection between one of the drive means and the member driven thereby; and means controlled by the other drive means to displace the connection relatively to its drive means.

31. In a machine of the class described, the combination with an adding and substracting totalizer; of a negative balance correction key; means to normally lock the key against operation; and means controlled by the totalizer wheel of highest denomination to release the key-locking means.

32. In a machine of the class described, the combination with an adding and subtracting totalizer; of a negative balance correction key; means to normally lock the key against operation; a cam controlled by the totalizer unit of highest denomination; and means operated by the cam to release the key-locking means.

33. In a machine of the class described, the combination with an adding and subtracting totalizer; of a negative balance correction key; an obstruction to normally prevent operation of the key; and means controlled by the totalizer when the character of the amount registered thereon changes, to withdraw the obstruction to ineffective position.

34. In a machine of the class described, the combination with an adding and subtracting totalizer; amount determining devices; and means to release erroneously actuated amount determining means prior to an operation of the machine; of a detent to prevent operation of the releasing means for the erroneously depressed amount determining devices; a negative balance correction key; means to normally prevent the operation of the negative balance correction key, and to maintain the detent ineffective; and means controlled by the totalizer to disable the preventing means for the negative balance correction key.

35. In a machine of the class described, the combination of an adding and subtracting totalizer; a negative balance correction key; means controlled by the totalizer to prevent the operation of said key until said adding and subtracting totalizer carries a negative balance; an adjustable total control means; and means controlled thereby to prevent operation of the negative balance correction key when the total control means is in a certain position.

36. In a machine of the class described, the combination of a shiftable adding and subtracting totalizer; actuators relatively to which the totalizer is shiftable; a negative balance correction key; means controlled by the totalizer to prevent the operation of said key until said totalizer carries a negative balance and is in subtracting position relatively to the actuators; an adjustable total control means; and means controlled thereby to prevent operation of the negative balance correction key when the total control means is in a certain position.

In testimony whereof I affix my signature.

BERNIS M. SHIPLEY.